United States Patent
Kalpathi et al.

[11] Patent Number: 6,011,368
[45] Date of Patent: Jan. 4, 2000

[54] SENSORLESS DETECTION OF A LOCKED ROTOR IN A SWITCHED RELUCTANCE MOTOR

[75] Inventors: Ramani R. Kalpathi, Ann Arbor, Mich.; Peter T. Szymanski, Toledo, Ohio

[73] Assignee: Dana Corporation, Toledo, Ohio

[21] Appl. No.: 09/281,175

[22] Filed: Mar. 30, 1999

[51] Int. Cl.[7] .................................. H02H 7/08; H02P 7/05
[52] U.S. Cl. ........................... 318/434; 318/254; 318/701
[58] Field of Search ..................................... 318/138, 254, 318/434, 445, 449, 685, 696, 700, 701

[56] References Cited

U.S. PATENT DOCUMENTS

| | | | |
|---|---|---|---|
| 4,656,553 | 4/1987 | Brown ........................................ | 361/31 |
| 5,140,244 | 8/1992 | Lyons et al. ............................. | 318/701 |
| 5,488,276 | 1/1996 | Nishibe .................................... | 318/473 |
| 5,502,362 | 3/1996 | Brandes ................................... | 318/471 |
| 5,554,913 | 9/1996 | Ohsawa .................................... | 318/434 |
| 5,574,608 | 11/1996 | Fukuoka ................................... | 361/23 |
| 5,612,620 | 3/1997 | Mullin et al. ............................ | 324/772 |
| 5,619,119 | 4/1997 | Sugimoto et al. ....................... | 318/450 |
| 5,637,972 | 6/1997 | Randall et al. .......................... | 318/616 |

*Primary Examiner*—Bentsu Ro
*Attorney, Agent, or Firm*—Dykema Gossett PLLC

[57] ABSTRACT

A method and circuit for detecting a locked rotor in a switched reluctance motor are provided. The method includes the step of measuring, at a predetermined frequency, the time required for a current in the motor to rise or fall between predetermined current levels to thereby obtain a plurality of sample rise or fall times. The method further includes the step of comparing first and second sample times of the plurality of sample times to obtain a time comparison value that is indicative of a change in position of the rotor. Because current rise and fall times are indicative of, and vary with, rotor position, a comparison of multiple rise or fall times may be used to indicate a change in position of the rotor and, therefore, whether the rotor is in motion or is locked. The method may finally include the step of comparing the time comparison value to a predetermined reference value that is indicative of a locked rotor.

20 Claims, 4 Drawing Sheets

SENSORLESS DETECTION OF A LOCKED ROTOR IN A SWITCHED RELUCTANCE MOTOR

BACKGROUND OF THE INVENTION

1. Field of the Invention

This invention relates to switched reluctance motors, and, more particularly, to a method and a circuit for detecting a locked rotor in a switched reluctance motor.

2. Disclosure of Related Art

A conventional switched reluctance motor (SRM) includes a stator having a plurality of pairs of diametrically opposed stator poles and a rotor having a plurality of pairs of diametrically opposed rotor poles. Windings or coils are typically disposed about the stator poles and the windings around any two diametrically opposed stator poles may be connected in series or in parallel to define one motor phase of the multiphase SRM. The windings associated with a motor phase may be referred to as a phase coil. By generating current through the phase coil, magnetic fields are established about the stator poles and a torque is produced that attracts a pair of rotor poles into alignment with the stator poles. The current in the phase coils is generated in a predetermined sequence in order to produce a constant torque on the rotor. The period during which current is provided to the phase coil—and the rotor poles are brought into alignment with the stator poles—is known as the "active stage" or conduction interval of the motor phase. At a certain point—either as the rotor poles become aligned with the stator poles or at some point prior thereto—it becomes desirable to commutate the current in the phase coil to prevent a negative or braking torque from acting on the rotor poles. Once this "commutation point" is reached, current is no longer generated in the phase coil and the current is allowed to dissipate from the phase coil. The period during which current is allowed to dissipate from the phase coil is known as the "inactive stage" of the motor phase.

Conventional SRMs require a means for detecting a condition in which the rotor of the motor has stopped moving, or become "locked", despite a continuing supply of current to the motor phase coils. If the rotor becomes locked, a continuing supply of current can cause the motor's control circuitry to overheat which can result in damage to the control circuitry and to the motor itself. Conventional methods and circuits for detecting locked rotors have generally relied on the use of position sensors. The use of position sensors is disadvantageous, however, because position sensors are relatively large, increase the cost of the motor and control circuitry, and are not very reliable.

There is thus a need for a method and circuit for detecting a locked rotor in a switched reluctance motor that will minimize or eliminate one or more of the above-mentioned deficiencies.

SUMMARY OF THE INVENTION

The present invention provides a method and a circuit for detecting a locked rotor in a motor such as a switched reluctance motor.

An object of the present invention is to provide a method and circuit for detecting a locked rotor that may be implemented using relatively inexpensive integrated circuits.

The inventive method and circuit are based on the principle that current rise and fall times in the phase coils of a switched reluctance motor are directly proportional to, and vary with, the level of inductance in the phase coil. Because the level of inductance in the phase coil is indicative of rotor position, current rise times or current fall times can also be used to indicate rotor position and, therefore, whether or not the rotor is in motion or is locked.

A method for detecting a locked rotor in a motor in accordance with the present invention includes the step of measuring, at a predetermined frequency, the time for a current in the motor to rise or fall between first and second predetermined current levels. By repeatedly measuring the time for the current to rise or fall between the predetermined current levels, a plurality of sample times are obtained. In one embodiment of the invention, each of the sample times represents the current rise or fall time in a single phase coil of the motor and the predetermined frequency is set to ensure that the sample times are measured during a single phase interval (i.e., the period between the start of consecutive conduction intervals in a motor phase coil). In a second embodiment of the invention, the sample times represent the current rise or fall time in different phase coils of the motor and the predetermined frequency is set to ensure that the sample times are measured during equivalent periods in phase intervals corresponding to each of the respective phase coils.

A method in accordance with the present invention may also include the step of comparing first and second sample times of the plurality of sample times to obtain a time comparison value. The time comparison value may be indicative of a change in rotor position and, therefore, whether or not the rotor is locked. In the first embodiment of the invention, the time comparison value will indicate that the rotor is locked if the time comparison value indicates that the sample times are equivalent. This follows from the fact that current rise or fall times generally vary during a single phase interval if the rotor is in motion. In the second embodiment of the invention, the time comparison value will indicate that the rotor is locked if the time comparison value indicates that the sample times differ. This follows from the fact that current rise or fall times measured at equivalent points within multiple phase intervals are approximately equal if the rotor is in motion.

A method in accordance with the present invention may finally include the step of comparing the time comparison value to a predetermined reference value. Because of variations in the time of to measurement and other variables, the reference value may be used to indicate whether the relative difference or equality shown by the time comparison value is indicative of a locked rotor.

A circuit for detecting a locked rotor in a motor in accordance with the present invention includes means for measuring, at a predetermined frequency, the time for a current in the motor to move between first and second predetermined current levels. Again, by repeatedly measuring the time for the current to move between the predetermined levels, a plurality of sample times are obtained. The circuit may also include means for comparing first and second sample times of the plurality of sample times to obtain a time comparison value that is indicative of a change in position of the rotor and means for comparing the time comparison value to a predetermined reference value.

A circuit and method in accordance with the present invention may be implemented using relatively small, inexpensive, and reliable integrated circuits. As a result, the inventive method and circuit require less space, are less expensive, and are more reliable than conventional methods and circuits for detecting locked rotors.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
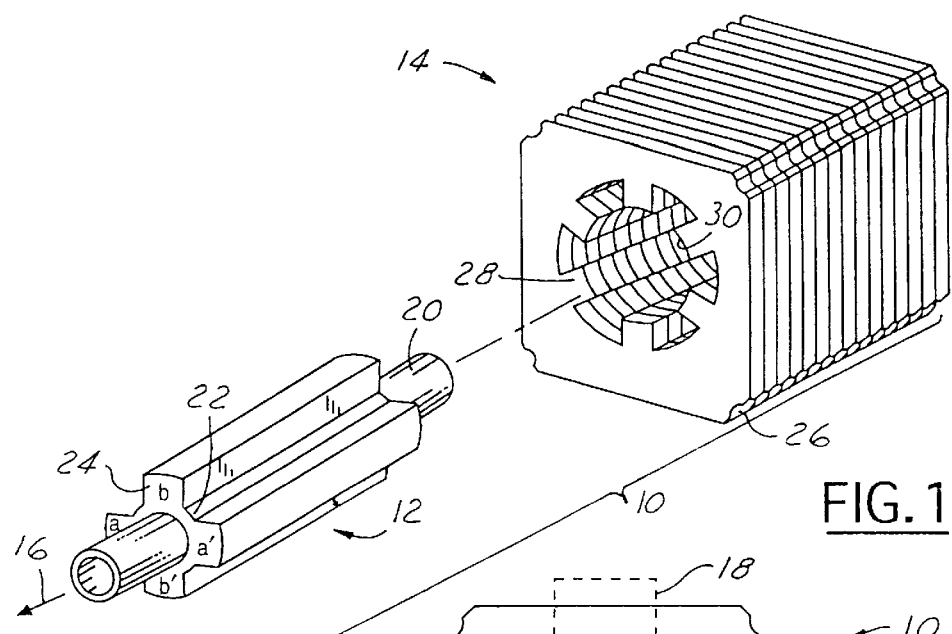
FIG. 1 is an exploded perspective view of a conventional switched reluctance motor.
Figure 2:
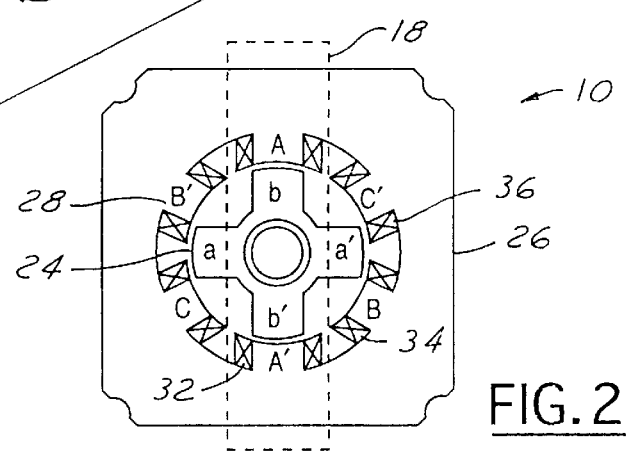
FIG. 2 is a cross-sectional view of a conventional switched reluctance motor.

Referring now to the drawings wherein like reference numerals are used to identify identical components in the various views, FIGS. 1 and 2 illustrate a conventional switched reluctance motor 10. Although the illustrated motor comprises a switched reluctance motor, it should be understood that the invention as disclosed herein could be applied to other motors as is known in the art. Motor 10 includes a rotor assembly 12 and a stator assembly 14, both of which may be centered about an axis 16. A representative motor phase 18 is indicated by a dashed-line box, while the other two motor phases are not shown. Although the illustrated embodiment includes three motor phases 18, it will be understood by those skilled in the art that the number of motor phases 18 may vary.

Rotor assembly 12 is provided to move a load (not shown) connected to rotor assembly 12. Assembly 12 includes a shaft 20 and a rotor 22 disposed about shaft 20. Shaft 20 is provided to engage either the load or another means for engaging the load. Shaft 20 extends longitudinally along axis 16 and may be centered about axis 16. Rotor 22 is provided to impart rotation to shaft 20 and is capable of clockwise or counter-clockwise rotation. Rotor 22 may be made from a material having a relatively low magnetic reluctance, such as iron. Rotor 22 may be centered about axis 16 and may include a spline or key (not shown) configured to be inserted within a keyway (not shown) in shaft 20. Rotor 22 includes a plurality of radially outwardly extending rotor poles 24 configured as diametrically opposed rotor pole pairs a–a', b–b'. Each of poles 24 is generally rectangular in cross-section and may include one or more radially outwardly extending teeth as is known in the art. It will be understood by those skilled in the art that the number of poles 24 of rotor 22 may vary.

Stator assembly 14 is provided to produce a torque to cause rotation of rotor assembly 12. Stator assembly 14 may comprise a plurality of laminations 26 that are formed from a material, such as iron, having a relatively low magnetic reluctance. Assembly 14 includes a plurality of radially inwardly extending poles 28 configured as diametrically opposed stator pole pairs A–A', B–B', C–C'. Each pair of stator poles 28 is provided to attract a corresponding pair of rotor poles 24 of rotor assembly 12 and thereby cause rotation of rotor assembly 12. Poles 28 are generally rectangular in cross-section and may include one or more radially inwardly extending teeth (not shown) as is known in the art. Poles 28 may extend along the axial length of stator assembly 14 and define a bore 30 that is adapted to receive rotor assembly 12. It will be understood by those in the art that the number of stator poles 28 may vary.

Rotation of rotor assembly 12 is produced by initiating, and later commutating, in a predetermined sequence, conduction cycles in phase coils 32, 34, 36 surrounding each stator pole pair. Phase coils 32, 34, 36 are formed by connecting, in series or in parallel, windings on diametrically opposed stator poles 28. As one of phase coils 32, 34, 36 begins to conduct current, the nearest rotor pole pair is magnetically attracted towards the stator pole pair around which the energized phase coil is wound. By initiating and commutating conduction cycles in phase coils surrounding consecutive stator pole pairs, a relatively constant torque can be produced.

Figure 3:
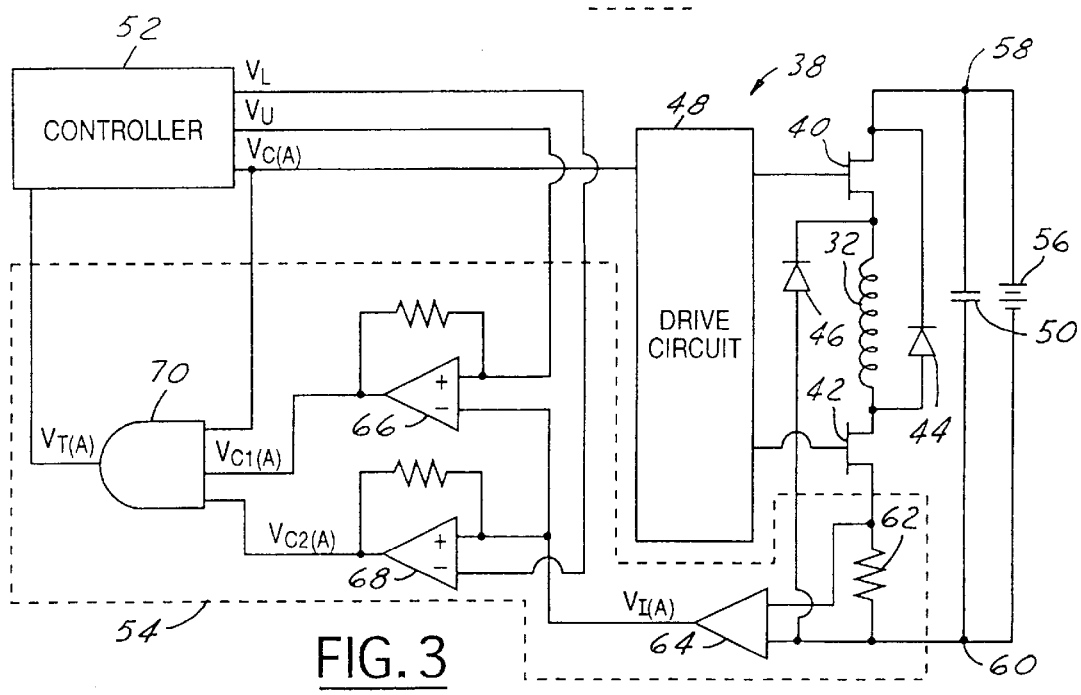
FIG. 3 is a combination schematic and block diagram illustrating a circuit for detecting a locked rotor in accordance with the present invention.

Referring now to FIG. 3, a circuit 38 for controlling motor 10 and for detecting a locked rotor 22 (or any other component of rotor assembly 12) in accordance with the present invention is illustrated. Circuit 38 may include means, such as switches 40, 42, for selectively providing current to phase coil 32, diodes 44, 46, a drive circuit 48, a capacitor 50, and a controller 52. In accordance with the present invention, circuit 38 may also includes means, such as time measurement circuit 54, for measuring the time required for a current in coil 32 to rise or fall between a pair of predetermined current levels, and means, such as controller 52 operating under the control of a set of programming instructions (i.e., software) for comparing the measured rise or fall times to each other and to a predetermined reference value indicative of a locked rotor 22. Circuit 38 represents an equivalent circuit for one motor phase 18 of motor 10. It should be understood, however, that portions of circuit 38, such as controller 52, may form part of additional motor phases 18.

Switches 40, 42 are provided to selectively couple a power supply 56 to phase coil 32 to energize and deenergize coil 32. Switches 40, 42 are conventional in the art and may take any of a plurality of forms well known in the art. For example, switches 40, 42 may comprise MOSFETs. Switch 40 is connected to a first end of coil 32 in series with coil 32. Switch 42 is connected to a second end of coil 32, also in series with coil 32. Switches 40, 42 are responsive to various control signals, such as phase control signal $V_{C(A)}$, generated by controller 52.

Diodes 44, 46 are provided to control the dissipation of current from coil 32 and, in particular, to return the current in coil 32 to capacitor 50 and power supply 56. Diodes 44, 46 are conventional in the art. Diode 44 may be connected in parallel with the series combination of switch 40 and coil 32. Diode 46 may be connected in parallel with the series combination of switch 42 and coil 32.

Drive circuit 48 is provided to adjust the voltage level of phase control signal $V_{C(A)}$ in a conventional manner to account for different tolerances and requirements among the components of circuit 38. Drive circuit 48 may also be provided to control the current within coil 32 within a hysteresis current band during a conduction interval in coil 32.

Capacitor 50 is provided to store the electrical energy dissipated from coil 32 when either of switches 40, 42 is opened. Capacitor 50 is conventional in the art and may have a first plate connected to a common node 58 and a second plate connected to a common node 60.

Controller 52 is provided to initiate and commutate conduction cycles in each motor phase 18 of motor 10. In accordance with the present invention, controller 52 is also provided as a means for comparing the current rise and fall times measured by time measurement circuit 54 to obtain a time comparison value and as a means for comparing the time comparison value to a predetermined reference value indicative of a locked rotor 22. Controller 52 is conventional in the art and may comprise either discrete circuits or a programmable microcontroller. Controller 52 generates phase control signals, such as phase control signal $V_{C(A)}$, to control the initiation and commutation of the conduction interval in each motor phase 18. Controller may also generate lower and upper current level signals $V_L$ and $V_U$, respectively, which are used by time measurement circuit 54 in the manner described hereinbelow.

Time measurement circuit 54 is provided to measure the time for current in coil 32 to rise or fall between predetermined lower and upper current levels. Circuit 54 may include means, such as sensing resistor 62 and amplifier 64, for generating a current indicative signal $V_{I(A)}$ indicative of the level of current in coil 32. Circuit may also includes comparators 66, 68 and a logic circuit 70.

Sensing resistor 62 is provided to generate a signal indicative of the level of current in coil 32 and is conventional in the art. Resistor 62 is connected in series with switch 42 and has one end connected to node 60. It will be understood by those in the art that a variety of conventional current sensors could be employed in place of resistor 62, including, but not limited to, Hall effect current sensors.

Amplifier 64 is provided to convert the signal generated by sensing resistor 62 into current indicative signal $V_{I(A)}$. Amplifier 64 is also conventional in the art.

Comparators 66, 68 are provided to compare the level of current in coil 32—as indicated by current indicative signal $V_{I(A)}$—to predetermined upper and lower current levels—as represented by current level signals $V_U$ and $V_L$, respectively. Comparators 66, 68 are conventional in the art. The positive input of comparator 66 is responsive to upper current level signal $V_U$ generated by controller 52 while the negative input of comparator 66 is responsive to current indicative signal $V_{I(A)}$ generated by amplifier 64. Comparator 66 outputs a comparison signal $V_{C1(A)}$ indicative of whether the level of current in coil 32 is less than or greater than a predetermined upper current level—represented by current level signal $V_U$. The positive input of comparator 68 is responsive to current indicative signal $V_{I(A)}$ generated by amplifier 64 while the negative input of comparator 68 is responsive to current level signal $V_L$ generated by controller 52. Comparator 68 outputs a comparison signal $V_{C2(A)}$ indicative of whether the level of current in coil 32 is less than or greater than a predetermined lower current level—represented by current level signal $V_L$.

Logic circuit 70 is provided to generate a timing signal $V_{T(A)}$ indicative of the time required for the current in coil 32 to rise or fall between predetermined lower and upper current levels. Circuit 70 is conventional in the art and comprises an AND gate in the illustrated embodiment. It should be understood, however, that other gate configurations may be implemented without departing from the spirit of the present invention. Circuit 70 generates timing signal $V_{T(A)}$ responsive to phase control signal $V_{C(A)}$ and comparison signals $V_{C1(A)}$ and $V_{C2(A)}$.

Figure 4A:
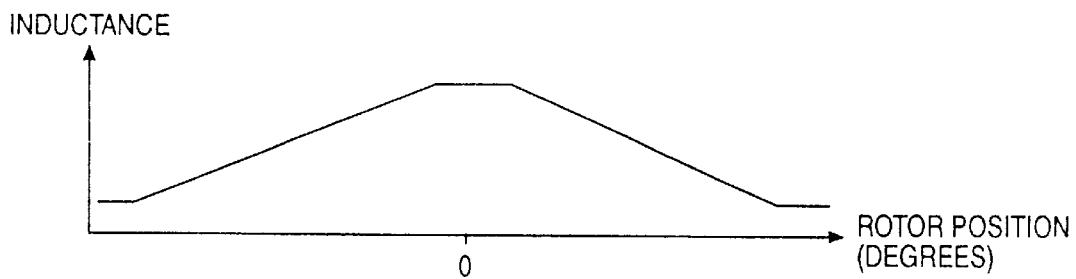
FIGS. 4A–B are timing diagrams illustrating the relationship between current rise time, inductance and rotor position.
Figure 4B:
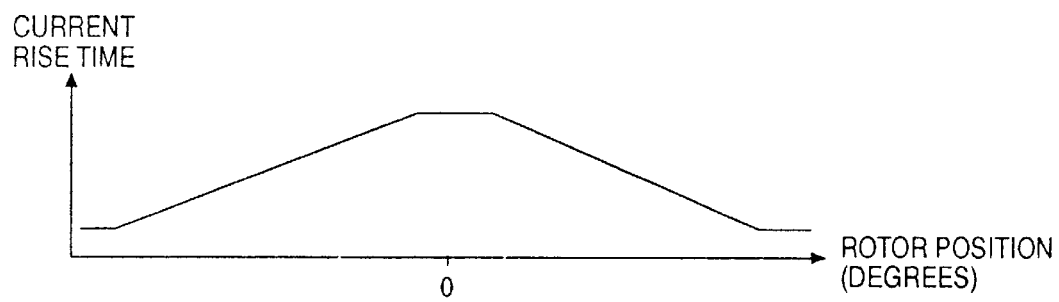
Figure 4C:
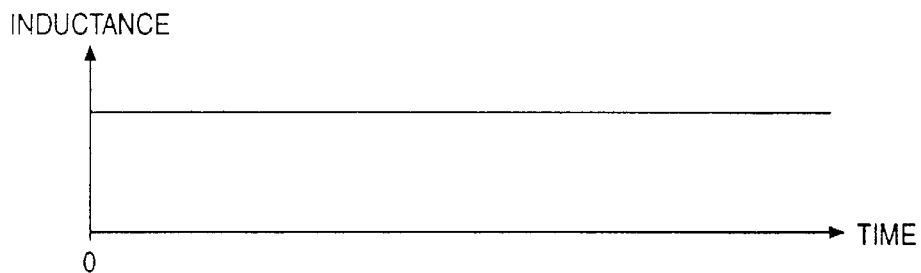
FIGS. 4C–D are timing diagrams illustrating the relationship between current rise time, inductance and the passage of time in a motor having a locked rotor.
Figure 4D:
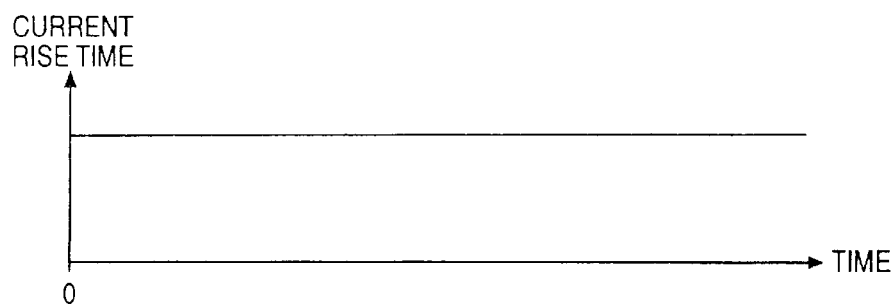

Referring now to FIGS. 4A–D, the principal upon which the inventive circuit and method are based will be described. As is known in the art, phase inductance can be used to estimate the position of rotor 22. As shown in FIG. 4A, the level of inductance in any motor phase 18 increases linearly as a pair of rotor poles 24 approach a corresponding pair of stator poles 28. Inductance reaches a maximum when the rotor poles 24 and stator poles 28 are aligned and then decreases linearly as the rotor poles 24 move past the stator poles 28. Referring now to FIG. 4C, in a motor having a stationary or locked rotor, the level of inductance in each motor phase of the motor is constant over time. As FIGS. 4A and 4C show inductance as a function of rotor position in a moving rotor and time in a stationary rotor, respectively, FIGS. 4B and 4D show current rise time as a function of rotor position in a moving rotor and time in a stationary rotor, respectively. Referring to FIG. 4B, as a pair of rotor poles 24 approach a corresponding pair of stator poles 28, the time period required for the current to rise between the two predetermined current levels increases linearly. When the rotor poles are aligned with the stator poles, a maximum amount of time is required for the current to rise between the two predetermined current levels. As the rotor poles move past the stator poles, the time required decreases linearly. Referring now to FIG. 4D, in a motor having a stationary or locked rotor, the time required for a current in a phase coil of the motor to rise between two predetermined current levels is constant over time. It should be understood that, although FIGS. 4B and 4D illustrate current rise time, the principles described herein are similarly applicable to current fall time.

As shown in FIGS. 4A–D, the time required for a current in a motor phase coil to rise or fall between two predetermined levels is directly proportional to the inductance of the phase coil. As a result, measuring current rise time or current fall time provides an estimate of rotor position. Further, because inductance and current rise and fall times vary as rotor position varies, current rise and fall times measured at discrete points in time may be used to determine whether the rotor is in motion or is stationary (i.e., locked).

Figure 5A:
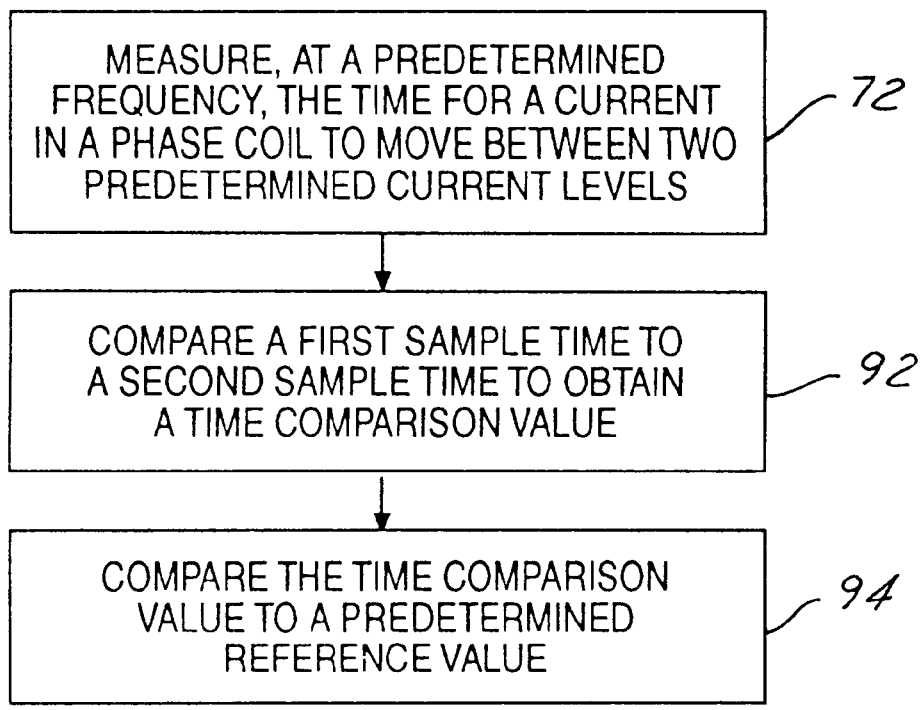
FIGS. 5A–B are flowchart diagrams illustrating a method for detecting a locked rotor in accordance with the present invention.
Figure 5B:
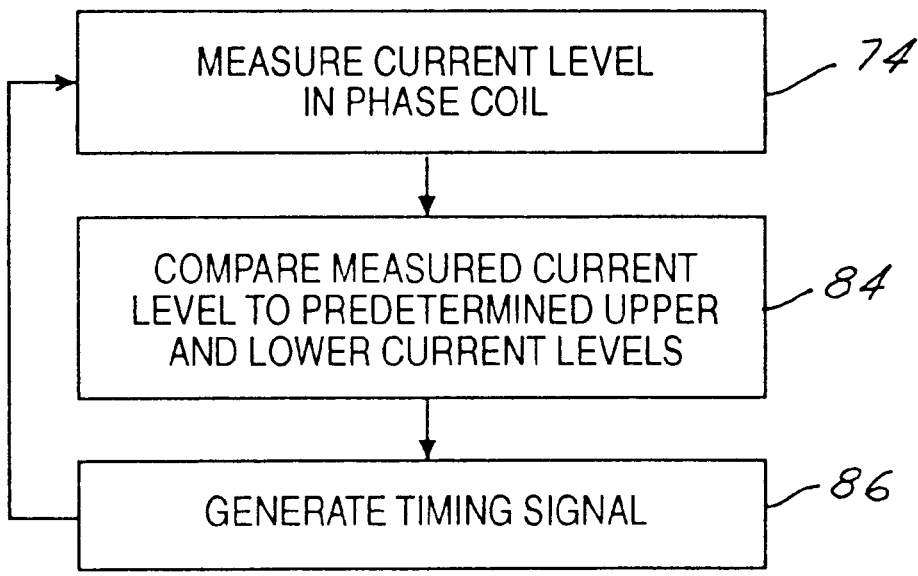

Referring now to FIG. 5A, a method for detecting a locked rotor 22 in a motor 10 in accordance with the present invention will be described. The method may include the step 72 of measuring, at a predetermined frequency, the time for a current in motor 10 to move between predetermined lower and upper current levels. Referring now to FIG. 5B, step 72 may include the substep 74 of sensing a level of a current in phase coil 32 of motor 10. As discussed hereinabove with reference to FIG. 3, the level of the current in coil 32 is determined using sensing resistor 62 and amplifier 64 which combine to generate a current indicative signal $V_{I(A)}$—shown in FIG. 6A—that is indicative of the level of current in coil 32.

Figure 6A:
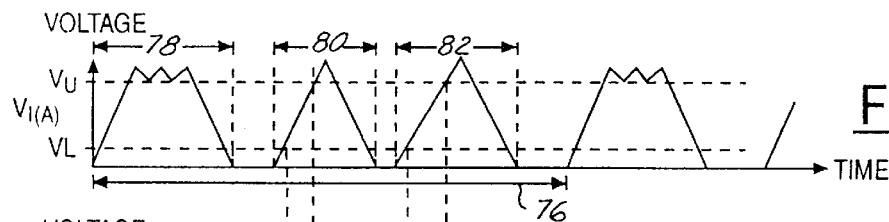
FIGS. 6A–J are timing diagrams illustrating a method for detecting a locked rotor in accordance with the present invention.

FIG. 6A illustrates the level of current indicative signal $V_{I(A)}$ over time. It should be understood, however, that the voltage, time, and other values illustrated in FIGS. 6A–J are not intended to convey actual values, but are instead intended to illustrate the present invention. As shown in FIG. 6A, each phase interval 76 of phase coil 32 may include a conduction interval 78 (during which a torque producing current is provided to phase coil 32) and a plurality of sampling intervals 80, 82 (during which current pulses are provided to phase coil 32 for the purpose of measuring current rise or fall time and detecting a locked rotor 22).

Figure 6B:
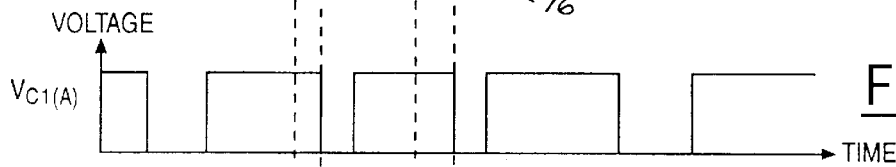
Figure 6C:
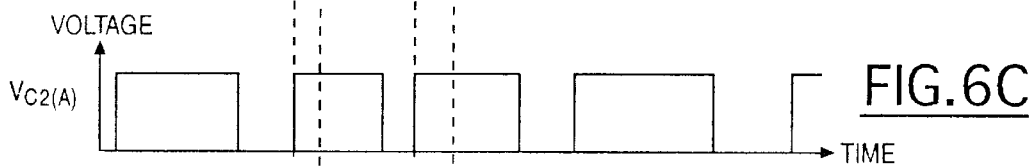
Figure 6D:
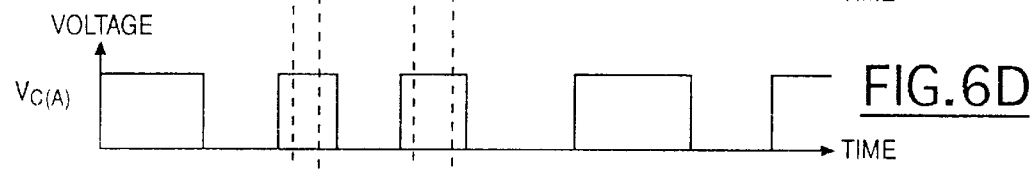

Referring again to FIG. 5B, step 72 may also include the substep 84 of comparing the level of current in coil 32 to predetermined upper and lower current levels. As described above with reference to FIG. 3, comparators 66, 68 generate comparison signals $V_{C1(A)}$ and $V_{C2(A)}$, respectively, responsive to current indicative signal $V_{I(A)}$ and upper and lower current level signals $V_U$ and $V_L$. In particular, as shown in FIG. 6B, comparison signal $V_{C1(A)}$ assumes a first logic state whenever the level of current in coil 32 (as indicated by current indicative signal $V_{I(A)}$)is less than a predetermined upper current level (indicated by upper current level signal $V_U$) and a second logic state whenever the level of current in coil 32 is greater than the predetermined upper current level. As shown in FIG. 6C, comparison signal $V_{C2(A)}$ assumes a first logic state whenever the level of current in coil 32 (as indicated by current indicative signal $V_{I(A)}$) is greater than a predetermined lower current level (indicated by lower current level signal $V_L$) and a second logic state whenever the level of current in coil 32 is less than the predetermined lower current level. The predetermined lower current level is preferably set at a high enough level to prevent false tripping of comparator 68 due to signal noise.

Referring again to FIG. 5B, step 72 may finally include the substep 86 of generating a timing signal $V_{T(A)}$ indicative of the time required for the current in coil 32 to rise or fall between the predetermined lower and upper current levels. As described hereinabove, with reference to FIG. 3, logic circuit 70 may be used to generate timing signal $V_{T(A)}$ responsive to comparison signals $V_{C1(A)}$ and $V_{C2(A)}$ and phase control signal $V_{C(A)}$. Phase control signal $V_{C(A)}$ may be used to ensure that the measured rise or fall time is provided to controller 52 only at selected intervals (i.e., during those time periods in which current is being provided to phase coil 32 for conduction or time sampling). Similarly, an additional selection signal may be generated by controller 52 and supplied to circuit 70 in place of, or together with phase control signal $V_{C(A)}$, to ensure that the measured rise or fall time is provided to controller 52 only during sampling intervals 80, 82 (i.e., as opposed to during conduction intervals such as interval 78). Phase control signal $V_{C(A)}$ may be controlled, in part, during sampling intervals 80, 82 by timing signal $V_{T(A)}$. In particular, phase control signal $V_{C(A)}$ may change logic states responsive to the falling edge of timing signal $V_{T(A)}$ (which signals the completion of a time measurement) thereby terminating the time sampling current pulse.

Figure 6E:
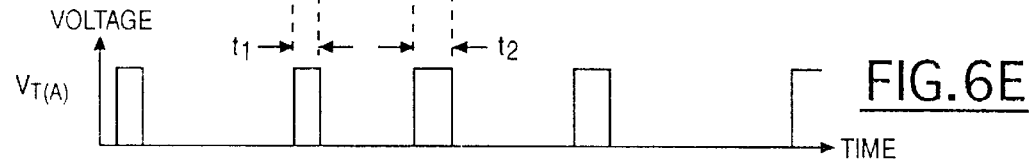
Figure 6F:
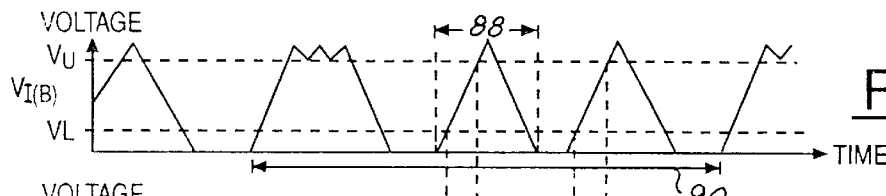
Figure 6G:
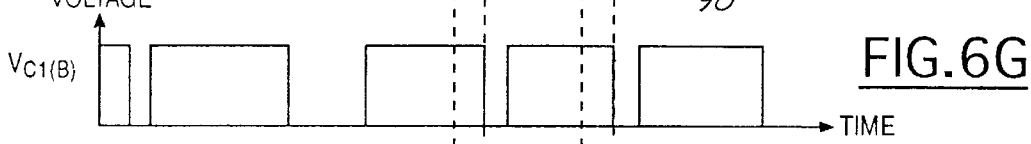
Figure 6H:
Figure 6I:
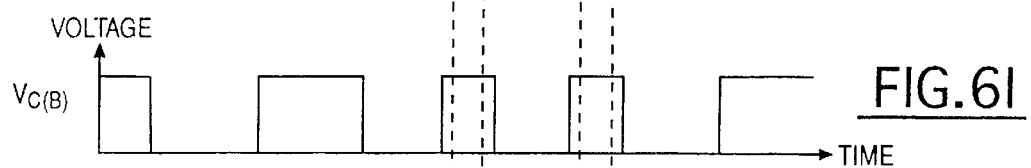
Figure 6J:
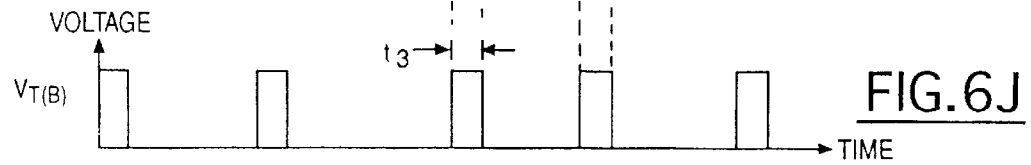

Substeps 74, 84, and 86 may be repeated at a predetermined frequency to obtain multiple current rise or fall times. In a first embodiment of the invention, the rise or fall time of the current in a single phase coil 32 is repeatedly measured during multiple sampling intervals within a single phase interval. Referring to FIGS. 6A and 6E, the current rise time may be measured during sampling intervals 80, 82 of phase interval 76 to obtain sample times $t_1$ and $t_2$. Because sample times $t_1$ and $t_2$ are measured during a single phase interval 76, the predetermined frequency should be greater than the commutation frequency of the motor (i.e., the frequency at which conduction intervals, and therefore phase intervals, are initiated or commutated within a phase coil of the motor). In a second embodiment of the present invention, the current rise or fall times are measured during corresponding sampling intervals in multiple phase intervals (each phase interval being associated with a different phase coil). Referring to FIGS. 6A and 6E, the current rise time in phase coil 32 may be measured during sampling interval 80 of phase interval 76 to obtain sample time $t_1$. Referring to FIGS. 6F and 6J, the current rise time in phase coil 34 may then be measured during a corresponding sampling interval 88 of phase interval 90 to obtain sample time $t_3$. Because the sample times $t_1$, $t_3$ are measured during equivalent intervals 80, 88 of distinct phase intervals 76, 90, the predetermined frequency should be substantially equal to the commutation frequency of the motor.

Referring again to FIG. 5A, a method in accordance with the present invention may also include the step 92 of comparing a first sample time with a second sample time to obtain a time comparison value $T_c$ indicative of a change in position of rotor 22 and, therefore, whether or not rotor 22 is locked. In particular, step 92 may include the substep of subtracting one of the first and second sample times from another of the first and second sample times. In the first embodiment of the present invention, time comparison value $T_c$ may be indicative of a locked rotor 22 where time comparison value $T_c$ indicates that the difference between the two sample times $t_1$ and $t_2$ is relatively low. Because sample times $t_1$ and $t_2$ are obtained during the same phase interval 76 in the first embodiment—and the current rise or fall times $t_1$ and $t_2$ should vary during a single phase interval 76 if rotor 22 is in motion (as described hereinabove with reference to FIGS. 4A and 4B and illustrated in FIG. 6A)—a small difference between sample times $t_1$ and $t_2$ may indicate a locked rotor 22. In the second embodiment of the present invention, time comparison value $T_c$ may be indicative of a locked rotor 22 where time comparison value $T_c$ indicates that the difference between sample times $t_1$ and $t_2$ is relatively high. Because sample times $t_1$ and $t_2$ are obtained during corresponding sampling intervals 78, 88 in distinct phase intervals 76, 90 in the second embodiment—and the current rise or fall times $t_1$ and $t_3$ should be relatively equal during such corresponding sampling intervals 78, 88 if rotor 22 is in motion (as illustrated in FIGS. 6A and 6F)—a large difference between sample times $t_1$ and $t_3$ may indicate a locked rotor 22.

Finally, a method in accordance with the present invention may also include the step 94 of comparing time comparison value $T_c$ to a predetermined reference value $T_{REF}$ indicative of a locked rotor 22. Because of variations in the time of measurement and other factors, the difference between two sampling times reflected in time comparison value $T_c$ may not always be sufficient to indicate a locked rotor 22. Accordingly, reference value $T_{REF}$ may be used to indicate whether the relative difference or equality shown by time comparison value $T_c$ is indicative of a locked rotor 22. In the first embodiment of the invention, step 94 may then include the substep of determining whether the absolute value of time comparison value $T_c$ is greater than reference value $T_{REF}$. If the absolute value of time comparison value $T_c$ is less than reference value $T_{REF}$, then rotor 22 may be stationary or locked. In the second embodiment of the invention, step 94 may include the substep of determining whether the absolute value of time comparison value $T_c$ is less than reference value $T_{REF}$. If the absolute value of time comparison value $T_c$ is greater than reference value $T_{REF}$, then rotor 22 may be stationary or locked.

Steps 72, 92, and 94 of the inventive method may be repeated a plurality of times to continuously verify the status of rotor 22. In either embodiment of the invention, sample times may be repeatedly compared to the first measured sample time $t_1$ or to a more recent and previous sample time.

A method and circuit in accordance with the present invention represent an improvement over conventional methods and circuits for detecting locked rotors because the inventive circuit and method may be implemented using relatively small, inexpensive, and reliable integrated circuits. These circuits will reduce the overall size and cost of the motor due to the absence of position sensors, and will increase the reliability of the motor.

While the invention has been particularly shown and described with reference to the preferred embodiments thereof, it is well understood by those skilled in the art that various changes and modifications can be made in the invention without departing from the spirit and scope of the invention.

We claim:

1. A method for detecting a locked rotor in a motor, comprising the steps of:

measuring, at a predetermined frequency, the time for a current in said motor to move between a first predetermined current level and a second predetermined current level whereby a plurality of sample times are obtained; and, comparing a first sample time of said plurality of sample times to a second sample time of said plurality of sample times to obtain a time comparison value wherein said time comparison value is indicative of a change in position of said rotor.

2. The method of claim 1 wherein said measuring step includes the substeps of:

sensing a level of said current in a phase coil of said motor;

comparing said level of said current to said first predetermined current level;

comparing said level of said current to said second predetermined current level; and, generating a timing signal indicative of one of said plurality of sample times.

3. The method of claim 1 wherein said step of comparing said first sample time to said second sample time includes the substep of subtracting one of said first and second sample times from another of said first and second sample times.

4. The method of claim 1 wherein said predetermined frequency is greater than a commutation frequency of said motor.

5. The method of claim 1 wherein said predetermined frequency is substantially equal to a commutation frequency of said motor.

6. The method of claim 1 wherein said first sample time corresponds to the time for said current to move between said first and second predetermined current levels in a first phase coil of said motor during a first sampling interval and said second sample time corresponds to the time for said current to move between said first and second predetermined current levels in said first phase coil during a second sampling interval.

7. The method of claim 1 wherein said first sample time corresponds to the time for said current to move between said first and second predetermined current levels in a first phase coil of said motor and said second sample time corresponds to the time for said current to move between said first and second predetermined current levels in a second phase coil of said motor.

8. A method for detecting a locked rotor in a motor, comprising the steps of:

measuring, at a predetermined frequency, the time for a current in said motor to move between a first predetermined current level and a second predetermined current level whereby a plurality of sample times are obtained;

comparing a first sample time of said plurality of sample times to a second sample time of said plurality of sample times to obtain a time comparison value, said time comparison value indicative of a change in position of said rotor; and, comparing said time comparison value to a predetermined reference value.

9. The method of claim 8 wherein said measuring step includes the substeps of:

sensing a level of said current in a phase coil of said motor;

comparing said level of said current to said first predetermined current level;

comparing said level of said current to said second predetermined current level; and, generating a timing signal indicative of one of said plurality of sample times.

10. The method of claim 8 wherein said step of comparing said first sample time to said second sample time includes the substep of subtracting one of said first and second sample times from another of said first and second sample times.

11. The method of claim 8 wherein said predetermined frequency is greater than a commutation frequency of said motor.

12. The method of claim 8 wherein said predetermined frequency is substantially equal to a commutation frequency of said motor.

13. The method of claim 8 wherein said first sample time corresponds to the time for said current to move between said first and second predetermined current levels in a first phase coil of said motor during a first sampling interval and said second sample time corresponds to the time for said current to move between said first and second predetermined current levels in said first phase coil during a second sampling interval.

14. The method of claim 8 wherein said first sample time corresponds to the time for said current to move between said first and second predetermined current levels in a first phase coil of said motor and said second sample time corresponds to the time for said current to move between said first and second predetermined current levels in a second phase coil of said motor.

15. A circuit for detecting a locked rotor in a motor, comprising:

means for measuring, at a predetermined frequency, the time for a current in said motor to move between a first predetermined current level and a second predetermined current level whereby a plurality of sample times are obtained; and, means for comparing a first sample time of said plurality of sample times and a second sample time of said plurality of sample times to obtain a time comparison value wherein said time comparison value is indicative of a change in position of said rotor.

16. The circuit of claim 15 wherein said measuring means includes:

means for generating a current indicative signal indicative of a level of said current;

a first comparator that generates a first comparison signal responsive to said current indicative signal and a first current level signal indicative of said first predetermined current level;

a second comparator that generates a second comparison signal responsive to said current indicative signal and a second current level signal indicative of said second predetermined current level; and, a logic circuit that generates a timing signal responsive to said first and second comparison signals.

17. The circuit of claim 15 wherein said predetermined frequency is greater than a commutation frequency of said motor.

18. The circuit of claim 15 wherein said predetermined frequency is substantially equal to a commutation frequency of said motor.

19. The circuit of claim 15 wherein said first sample time corresponds to the time for said current to move between said first and second predetermined current levels in a first phase coil of said motor during a first sampling interval and said second sample time corresponds to the time for said current to move between said first and second predetermined current levels in said first phase coil during a second sampling interval.

20. The method of claim 15 wherein said first sample time corresponds to the time for said current to move between said first and second predetermined current levels in a first phase coil of said motor and said second sample time corresponds to the time for said current to move between said first and second predetermined current levels in a second phase coil of said motor.

* * * * *